United States Patent [19]

Chen

[11] 4,266,363
[45] May 12, 1981

[54] AUTOMATIC TRAP FOR CATCHING COCKROACH

[76] Inventor: Chang C. Chen, No. 7, 12 La., Tsuey St., Pan Chiao Shih, Taipei Hsien, Taiwan

[21] Appl. No.: 70,465

[22] Filed: Aug. 28, 1979

[51] Int. Cl.³ .............................................. A01M 1/12
[52] U.S. Cl. .......................................... 43/73; 43/121
[58] Field of Search ..................... 43/121, 64, 65, 66, 43/73, 74

[56] References Cited

U.S. PATENT DOCUMENTS

| | | | |
|---|---|---|---|
| 982,001 | 1/1911 | Hardegen | 43/73 |
| 1,015,471 | 1/1912 | Bowser | 43/73 |
| 3,064,386 | 11/1962 | Horinek | 43/65 |
| 4,145,834 | 3/1979 | Quigley | 43/73 |

*Primary Examiner*—Nicholas P. Godici
*Attorney, Agent, or Firm*—Karl W. Flocks

[57] ABSTRACT

The automatic trap for catching cockroach mainly includes an automatic control mechanism. As cockroaches enter into the trap, they will inevitably touch a switch of said automatic control mechanism to drive a slipping plate forward and further to automatically sweep these cockroaches into a confinement cell. After that, the slipping plate will be also automatically back to its original position, restoring the control function of the automatic control mechanism, which is the particularly advantageous feature of the present invention.

7 Claims, 6 Drawing Figures

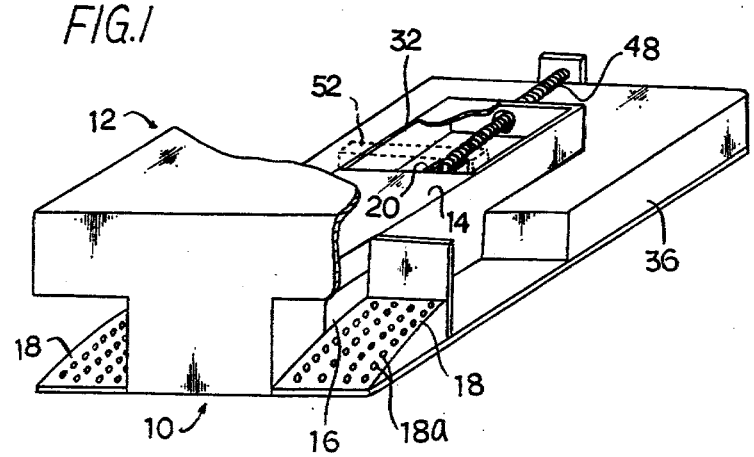
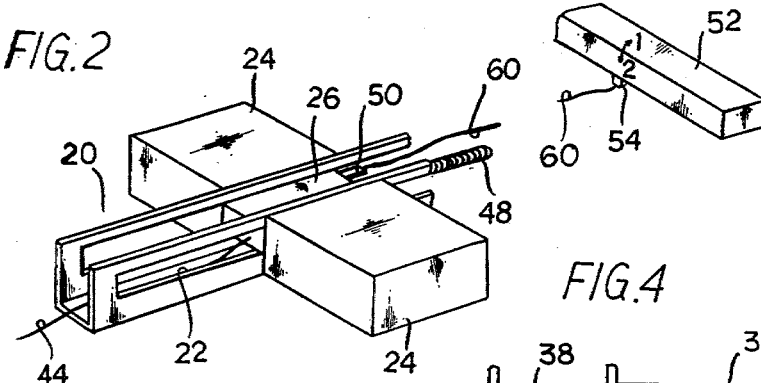
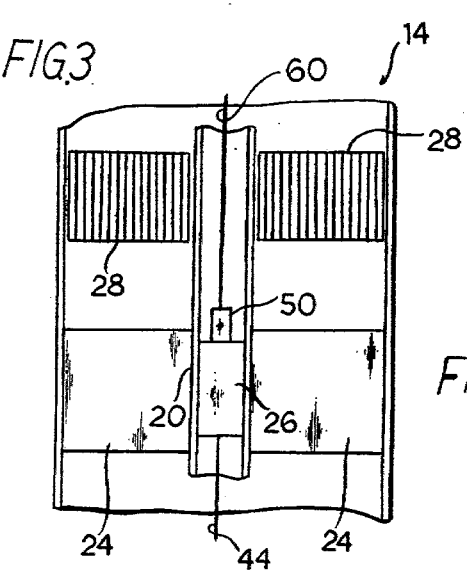
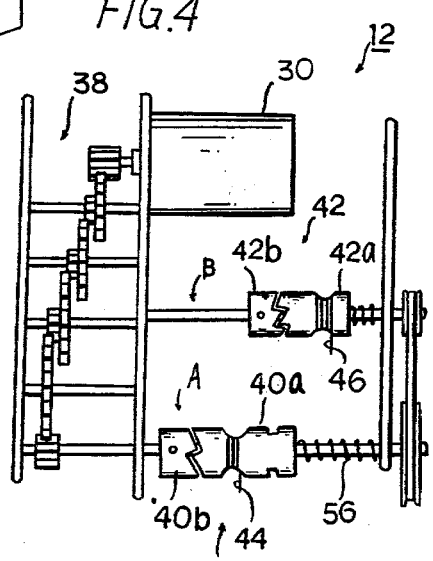
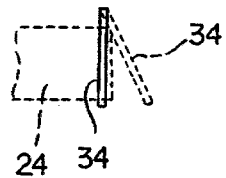
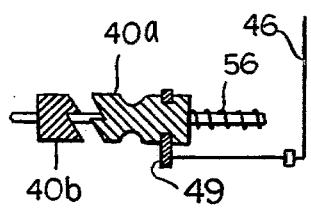

AUTOMATIC TRAP FOR CATCHING COCKROACH

SUMMARY OF THE INVENTION

The present invention relates to an automatic trap for catching cockroach and, more particularly, to an automatic trap for catching cockroach with novel and simple construction, having an automatic control mechanism.

Heretofore, with reference to the methods of killing or catching cockroaches, people mostly spread aerosol insecticide directly on the body of cockroaches or over the places where cockroaches usually appear. Consequently, carcasses of cockroaches are always spread over the floor making our living circumstances dirty. Especially, most of the cockroaches like to live or hide in cracks or darkness, so making it harder to clean out the carcasses.

Therefore, the primary object of the present invention is to overcome those inconveniences to people and to provide an automatic trap for catching cockroaches with a device having novel and simple construction which certainly has an improved effect.

Another object of the present invention is to disclose an automatic trap for catching cockroach which includes an automatic trap for catching cockroach which includes an automatic control mechanism. As cockroaches enter into the trap, they will inevitably touch a switch of said automatic control mechanism to drive a slipping plate forward and further to automatically sweep these cockroaches into a confinement cell. After that, the slipping plate will be also automatically moved back to its original position, restoring the control function of the automatic control mechanism, which is the particularly advantageous feature of the present invention.

A further object of the present invention is to provide an automatic trap for catching cockroach, which has the advantage of complete automatic control operation.

DESCRIPTION OF THE DRAWINGS

FIG. 1 is a partial perspective view of an automatic trap for catching cockroach according to the invention.

FIG. 2 is a view of the present invention, including a perspective view while the slipping plate is moving on the rail and a view showing relative position between the slipping plates and the electric current reversing switch.

FIG. 3 is a partial plan view of the inner side of the trapping house.

FIG. 4 is a plan view of the transmission mechanism on the upper part of the present invention.

FIG. 5 is a view showing relative position between the first clutch-pulley and the second clutch-pulley.

FIG. 6 is a view showing the closing and opening of the turning plate.

DETAILED DESCRIPTION

Referring to FIG. 1, the automatic trap for catching cockroach according to the present invention is mainly divided into two parts, including the lower part, as trapping mechanism 10, and the upper part, as transmission mechanism 12.

The trapping mechanism is comprised of a trapping house 14 which is designed as a centrally spaced casing opened at its rear side and provided respectively with an entrance 16 at two lateral sides of its front end, so cockroaches may enter into the trapping house from any one of two sloped passages 18 also provided on both sides of the front end of the trapping house 14. The sloped passage 18 is provided with a lot of holes 18a within which tasty materials, such as sugar, may be put for luring cockroaches. Specially now referring to FIG. 3, in the central part of the trapping house 14, a sectional U-shaped rail 20 is placed, both sides of which are respectively provided with a slender slot 22 for the horizontal shift of the connector 26 which connects to and between two slipping plates 24 and extends into said two slots 22 of the rail 20 transversely of the rail 20. Furthermore, the inner wall of the trapping house 14 near said entrance 16 is equipped with a pedal switch 28 constituted by multiple small metal plates, which is used for switching on the motor 30 of the transmission mechanism 12 which moves the slipping plates 24 forward. (With refferrence to the transmission mechanism 12 and the mechanism of the slipping plate 24, there will be more detailed description hereinafter.)

The rear opening of said trapping house 14 is provided with a closed room 32, which is partitioned, and connectable, with the trapping house 14 by a turning plate 34 capable of opening or closing respectively in one direction.

As shown in FIG. 4, the transmission mechanism 12 performs by means of a motor 30 through a transmission gear set 38 to drive the first clutch-pulley 40 and the second clutch-pulley 42 rotating in counter direction to each other. The driven pulley 40a of the first clutch-pulley 40 has wound around it a steel wire 44 connected at its other end to the front end of said connector 26 which is provided between two slipping plates 24. Further to refer FIGS. 4–5, the driven pulley 42a of the second clutch-pulley 42 also has wound around it a steel wire 46 connected at its other end to a ring 49 set on the driven pulley 40a of the first clutch-pulley 40. Therefore, when the motor 30 runs in clockwise direction, the driving pulley 40b of the first clutch-pulley 40 will engage with its counterpart, the driven pulley 40a, to rotate in the direction of arrow A and the steel wire 44 will be rolled up to retract the slipping plate 24 along a direction slipping back to its original position as it appeared in FIG. 2. However, due to the fact that the driven pulley 42a isn't engaged with the driven pulley 42b in face to face relationship, the driven pulley 42a will idle without any bad influence on the normal operation of the first clutch-pulley 40. And when the motor 30 runs in counterclockwise direction, the driving pulley 42b of the second clutch-pulley 42 will engage with its counterpart, the driven pulley 42a, to rotate in the direction of arrow B, the result of which will roll up the steel wire 46 to retract the driven pulley 40a of the first clutch-pulley 40 from the engaging position with the driving pulley 40b so as to have the driven pulley 40a idle. At this moment, because the tensive force resulting from the steel wire 44 on the front end of the slipping plate 24 disappears, the slipping plates will quickly move forward under the function of the tension spring 48 provided on the rear end of the connector 26. As soon as the extended portion 50 which is also provided on the rear end of the connector 26 touches the turning button 54 of the electric current reversing switch 52 provided on the upper side of the rear end of the trapping house 14, the turning button 54 will be turned to position 1 of its scale to change the electric current direction of a coil of the motor 30. Upon changing direction of said electric current to have the motor 30 run in clockwise direction, the driven pulley 42a of the second clutch-pulley 42 will idle as above described, and the driven pulley 40a of the first clutch-pulley will again engage with the driving pulley under the function of the restitutive force of a spring 56 and rotate together to roll up the steel wire 44 to retract the slipping plate 24 back to its original position. Also, said turning button 54 of the electric current reversing switch 52 is provided with a connecting wire 60 which is connected to the connector 26 provided between two slipping plates 24, so when the slipping plates 24 move back to their original position, the turning button 54 will be turned to position 2 of its scale, due to the connecting wire 60 being pulled straight. At this time, the electric current of the motor's coil will change its direction again. Therefore, if any cockroaches enter into the trapping house 14 and touch the pedal switch 28, the motor 30 will be switched on to run in counterclockwise direction and the slipping plate 24 will immediately slip forward to send these cockroaches to the rear end of the trapping house 14. The slipping plates 24 will further bump away the turning plate 34, capable of opening or closing in one direction, provided at the rear end of the trapping house 14, under the impulsive force of the slipping plate 24 to sweep these clockroaches into a confinement cell 36. In so performing, the trap will again restore its function for trapping cockroaches. Therefore, the trap may repeat its operating cycle all over again and catch lots of cockroaches by continual automatic operation.

While certain preferred embodiments of the invention have been illustrated by way of examples in the drawings and particularly described, it will be readily understood that various modifications may be made in the structure and arrangements within the scope of the invention.

I claim:

1. An automatic trap for catching cockroach comprising
   a transmission mechanism including
   a first clutch-pulley and a second clutch-pulley,
   a transmission gear set connected for driving said first and second clutch-pulleys,
   a motor connected to drive said transmission gear set;
   a trapping mechanism operatively connected to said transmission mechanism and including
   a trapping house forming a centrally spaced casing with an opening at its rear,
   an entrance to said trapping house at two lateral sides of its front end,
   a sectional U-shaped rail having slots therein located substantially centrally in said trapping house,
   a connector connected for horizontal movement in said slots by extension in said slots,
   a pair of slipping plates with one of each connected on opposite sides of said connector,
   a sloped passage outside each said entrance of said trapping house,
   a pedal switch inside said trapping house near said entrance connected for switching on said motor to move said slipping plates,
   a collecting room extending from said rear opening of said trapping house,
   a turning plate located for closing said rear opening between said collecting room and said trapping house,
   an electric current reversing switch located substantially toward the rear of said trapping house operatively connected to reverse operation of said motor.

2. An automatic trap for catching cockroach as claimed in claim 1, wherein said sloped passages have a plurality of holes within which tasty materials may be put for luring cockroaches.

3. An automatic trap for catching cockroach as claimed in claim 1, wherein an extended portion is extended from the rear end of said connector, which is between said slipping plates, a turning button on said reversing switch turned by said extended portion to change the direction of electric current.

4. An automatic trap for catching cockroach as claimed in claim 1, wherein a turning button on said reversing switch has a connecting wire which is connected to said connector connected between said two slipping plates.

5. An automatic trap for catching cockroach as claimed in claim 1, wherein a tension spring is provided on a rear end of said connector.

6. An automatic trap for catching cockroach as claimed in claim 1, wherein a driven pulley of said first clutch-pulley has a steel wire wound around said driven pulley with the other end connected to said connector.

7. An automatic trap for catching cockroach as claimed in claim 1, wherein a driven pulley of said second clutch-pulley has a steel wire wound around said driven pulley of said second clutch-pulley with its other end connected to a ring set on said driven pulley of said first cutch-pulley so when said driven pulley of said second clutch-pulley rolls up said steel wire thereon, the driven pulley of said first clutch-pulley will be pulled by said steel wire to retract from the engaging position with a driving pulley of the said first clutch-pulley.

* * * * *